(12) United States Patent
Cost et al.

(10) Patent No.: US 8,573,490 B2
(45) Date of Patent: *Nov. 5, 2013

(54) CONTACTLESS SMARTCARD BEZEL

(75) Inventors: Evan J. Cost, Audubon, PA (US); Peter Bullard, Schwenksville, PA (US); Robert Martin, West Chester, PA (US)

(73) Assignee: MEI, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,452

(22) Filed: Apr. 16, 2012

(65) Prior Publication Data

US 2012/0286044 A1 Nov. 15, 2012

Related U.S. Application Data

(63) Continuation of application No. 12/446,822, filed as application No. PCT/US2007/082274 on Oct. 23, 2007, now Pat. No. 8,157,167.

(60) Provisional application No. 60/974,900, filed on Sep. 25, 2007, provisional application No. 60/862,738, filed on Oct. 24, 2006.

(51) Int. Cl.
*G06F 7/08* (2006.01)

(52) U.S. Cl.
USPC .......................................... 235/381; 235/492

(58) Field of Classification Search
USPC .................. 235/381, 383, 379, 380, 492, 487
See application file for complete search history.

(56) References Cited

U.S. PATENT DOCUMENTS

| | | | | |
|---|---|---|---|---|
| 5,828,044 A | * | 10/1998 | Jun et al. | 235/380 |
| 5,955,718 A | * | 9/1999 | Levasseur et al. | 235/381 |
| 5,988,345 A | * | 11/1999 | Bergeron et al. | 194/203 |
| 6,296,182 B1 | * | 10/2001 | Ota et al. | 235/379 |
| 7,152,783 B2 | * | 12/2006 | Charrin | 235/379 |
| 8,157,167 B2 | * | 4/2012 | Cost et al. | 235/381 |

* cited by examiner

*Primary Examiner* — Daniel St Cyr
(74) *Attorney, Agent, or Firm* — Mintz Levin Cohn Ferris Glovsky and Popeo, P.C.

(57) ABSTRACT

A multi media payment device includes a banknote acceptor and a RF card reader, and also may include a magnetic card reader. A bezel assembly for connection to the bill acceptor preferably includes a reader unit to read magnetic swipe cards and contactless chip cards.

21 Claims, 11 Drawing Sheets

CONTACTLESS SMARTCARD BEZEL

CROSS-REFERENCE TO RELATED APPLICATIONS

This application is a continuation application of U.S. application Ser. No. 12/446,822, filed Jan. 20, 2010, which is a national phase filing under 35 U.S.C. §371 of international application number PCT/US2007/082274, filed Oct. 23, 2007, which claims the benefit of priority of U.S. Provisional Application No. 60/862,738, filed on Oct. 24, 2006, and U.S. Provisional Application No. 60/974,900, filed on Sep. 25, 2007, the contents of which are incorporated herein by reference.

BACKGROUND

New payment modes have been added to vending machines overtime as vending items became more expensive, and as the technology for reliable bill validators and card readers developed. Thus, for example, modern day vending machines may contain a coin slot for depositing coins, a bill entryway for inserting paper currency, and a card reader opening for inserting a debit or credit card.

Customarily, a separate bezel for each form of payment having an insertion slot or opening has been attached to the front panel of a vending machine. For example, payment acceptance devices for coins, bills and cards each are connected to separate bezels, with the three bezels located on the right side of the front panel. This area is sometimes referred to as the control panel.

As new forms of payment acceptance devices have been retrofit to existing machines, it has become more difficult to attach them to the control panel because the amount of space available is finite, and because of internal component space restrictions. Thus, some vending machines have bezels with currency insertion slots and/or credit card swipe slots located in areas other than the control panel. Consequently, one type of vending machine may differ from another by having bezels connected in different designated areas for payment, by accepting different forms of payment, and further may be marked in an entirely different manner.

In view of the various available bezel arrangements, consumers can become confused when it comes to the method and types of acceptable payments to enable a vend. Such non-uniformity may frustrate a customer, resulting in lost profits by the vending machine owners.

SUMMARY

Various aspects of the invention are set forth in the claims.

For example, in one aspect, a multi media payment device includes a banknote acceptor (e.g., a bill validator) and a RF card reader. In some implementations, the device further includes a magnetic card reader.

The disclosure also describes a bezel assembly for connection to a bill validator. The bezel includes a reader unit to read a contactless chip card. In some assembly can include a first slot for insertion of a bill, a second slot for swiping a magnetic swipe card, and a loop antenna to read a contactless chip card placed in proximity to the bezel assembly.

A vending machine can be upgraded with the capability of reading contactless chip cards and magnetic swipe cards by installing a bezel assembly comprising hardware to read the contactless chip cards and magnetic swipe cards connecting the bezel assembly to an input port of a data collecting module.

By integrating a contactless smart card reader into the bezel assembly of a banknote validator to be connected to a vending machine, some implementations facilitate reading contactless smart cards for credit card applications in the vending machine.

Other features and advantages will be apparent from the following detailed description, the accompanying drawings, and the claims.

DETAILED DESCRIPTION

Figure 1:
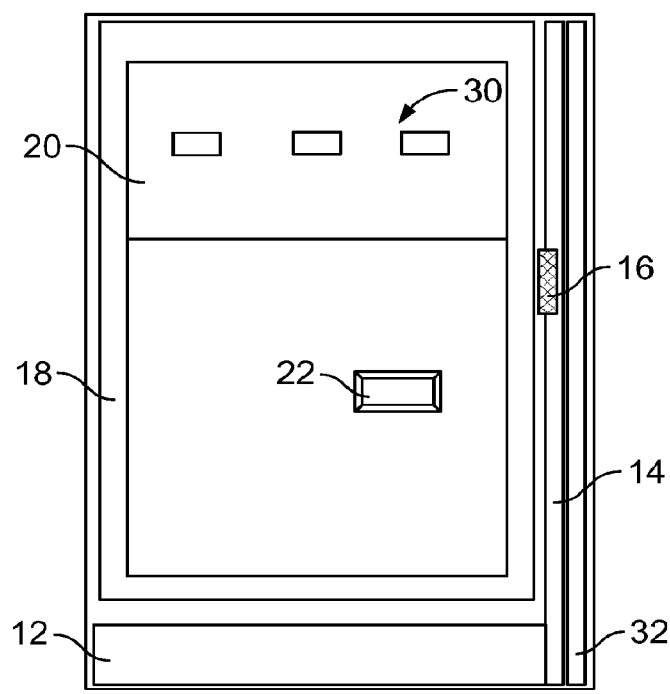
FIG. 1 illustrates an example of area allocation on a bezel 10 according to the invention.
Figure 2:
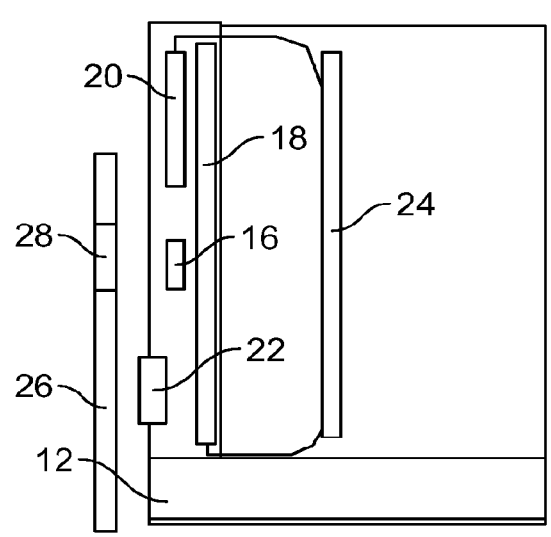
FIG. 2 is a side view illustrating the relative positioning of the various components according to the example of FIG. 1.

FIG. 1 illustrates an example of area allocation on a bezel assembly 10 that includes a contactless smart card reader integrated into the bezel of a banknote acceptor (e.g., a validator) configured for connection to a vending machine. FIG. 2 is a side view illustrating the relative positioning of the various components.

The bezel assembly 10 includes a horizontal slot 12 for the insertion of banknotes into the validator, which is connected to the control board of the vending machine that manages the credit and the vending of goods or services.

The bezel assembly 10 also includes a vertical slot 14, which partly overlaps the bill slot 12. When a credit card (or other type of card) having a magnetic stripe is swiped through the vertical slot, information stored by the magnetic stripe is read by the card reader, which includes a low profile magnetic head 16. The card reader is separate from the bill validator processing unit and is connected directly to a data processing module which, apart from other vending machine audit functions, processes the card data and connects to a network such as a local area network (LAN) operations.

The card reader also includes an antenna loop 18 to read information stored in a contactless smart card 26 containing a radio frequency (RF) microchip 28 (FIG. 2). The smart card 26 can be conform, for example, to ISO standard 14403. The antenna 18 is made, for example, of a multi-layer printed circuit board and should be located in very close proximity to the location where the user will present the smart card 26 to the machine (e.g., approximately at the center of the bezel area, which should correspond to the gravity center of the antenna loop). Thus, the antenna 18 should be close to the front wall of the bezel assembly 10.

The bezel assembly 10 further includes a display to provide information or instructions to the user, and a button 22 that can be pressed to allow a customer to terminate or cancel the transaction. The display, which can be implemented, for example, as an alpha-numeric display or a dot matrix graphic display, should be located at the front of the bezel assembly so as to be visible to the user.

The approximate size of the aperture for the bezel assembly in a typical vending machine in the United States is about 86 mm by 108 mm, although the precise dimensions vary slightly among manufacturers. In a particular implementation, the aspect ratio of the bezel assembly is about 84.5 mm by 107.5 mm. Thus, the bezel assembly has an external form factor that is compatible with an industry standard footprint.

The various components compete for the real estate space available for the bezel assembly. For example, the capability to read a smart card without contact at a minimum distance from the antenna 18 imposes a minimum size to the antenna, which may be larger than the available aperture for the bezel assembly. To accommodate the components, some of the components overlap one another at least partially. That needs to be accomplished, however, without altering their operability in an undesirable way.

A viable implementation can be obtained by sizing the antenna loop 18 to approximately the available area of the aperture remaining after space has been allocated to the bill entry slot 12 and the magnetic stripe slot 14, and laying the display 20 on top of it in an overlapping fashion. The display 20 should be sufficiently thin to minimize the spacing it creates between the antenna 18 and a smart card held by a customer in front of the bezel. For example, a suitable display technology can be implemented using chip-on-glass LCD technology. Such a display uses back-lighting, which can be obtained by integrating light emitting diodes ("LEDs") 30 on the printed circuit board ("PCB") for the antenna 18.

The typical radiating area of the antenna 18 is a loop around the perimeter of a rectangular area. In some implementations, the internal area defined by the loop is empty. Alternatively, as in the illustrated example, the internal area defined by the loop can be used for other components (e.g., the cancel button 22 and back-lighting LEDs 30), so long as those other components create minimum interference with the optimum, or desired, radiation pattern. In the illustrated layout of FIG. 2, the size of the antenna PCB is approximately 64.2 mm by 61.85 mm.

Reading and decoding of the credit card or smart card information is performed by a controller that includes a microcomputer mounted on a control board 24 (FIG. 2) installed in the bezel assembly 10. Each of the magnetic head 16, the antenna loop 18, the cancel button 22, the display 20, the back-lighting LEDs 30 and a light pipe strip (discussed below) is electrically connected to the controller. The controller is connected to a data processing unit installed as a module of the vending machine. The controller and the data processing unit interact, for example, via a serial protocol and a set of command language. For compatibility with existing systems, the card reader controller can connect to the same port that earlier designs used for a single magnetic card swipe reader. Depending on the type of card presented by the user, the controller reads either the contact-less smart card chip data or the swipe card data. In the case of a smart card, the controller authenticates the card using public and private encryption keys.

Figure 3:
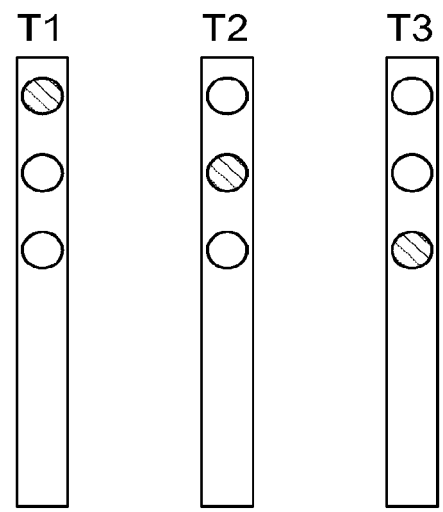
FIG. 3 illustrates an example of a flashing sequence of LEDs.

Another feature of the bezel assembly provides a predetermined visual effect through use of a light pipe strip 32 on the side of the credit card swipe slot 14. The light pipe strip 32 includes a set of LEDs flashing in accordance with a predetermined sequence. Illuminating sections of the light pipe 32 in this manner creates the effect of an airplane runway strip and suggests the direction of movement for insertion of a credit card in the swipe slot 14. The molded light pipe elements can be made, for example, of a material with a volume diffusion property such as the commercially available material sold under the trade name Acrylite™. Use of a volume diffusing material can produce a more aesthetically pleasing effect than surface texturing, which can leave visual hotspots. An example of a flashing sequence of the LEDs is illustrated in FIG. 3 for three times T1, T2 and T3, where $T1<T2<T3$. The sequential flashing is repeatedly performed. Thus, at least some of the indicator lights (LEDs) are operable to flash in a strobe pattern and sequence to create an optical illusion of motion.

The bezel assembly also can include an optical light pipe that directs light emitted by status LEDs mounted on the banknote acceptor chassis to the front face of the bezel assembly. This feature is useful because it facilitates the design of the bezel assembly as a standalone accessory that can be retrofitted to banknote acceptors already in service. The light from the status LEDs and appearing at the front face of 15 the bezel assembly can be used by service personnel for diagnostic purposes.

The bezel assembly further can be equipped with a small audio buzzer to provide additional feedback to the user about the progress of the transaction and to enable the system to conform to common user interface standards.

Figure 4:
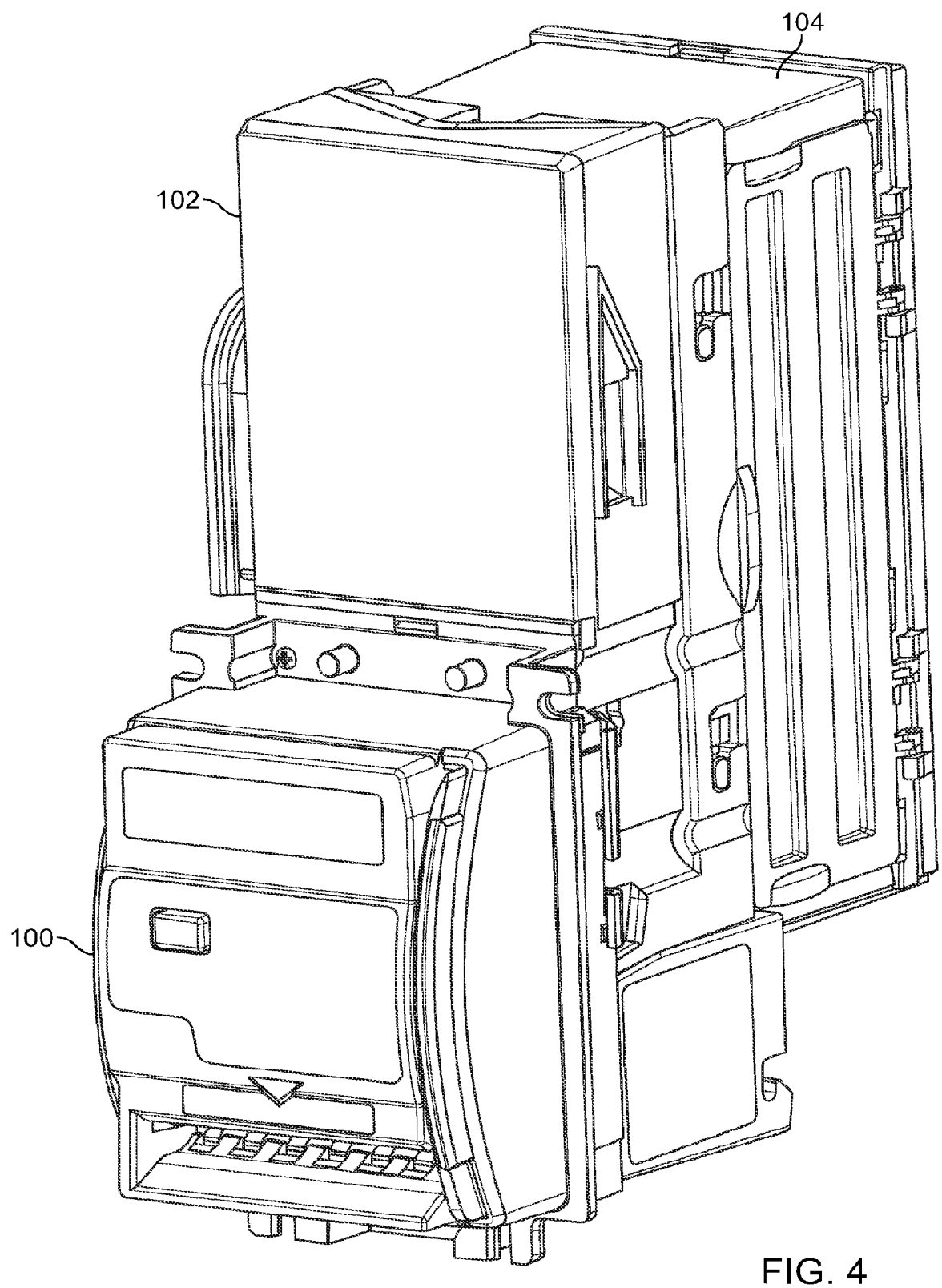
FIG. 4 is an isometric view of a bezel assembly installed on a bill validator in an upstacker version.
Figure 5:
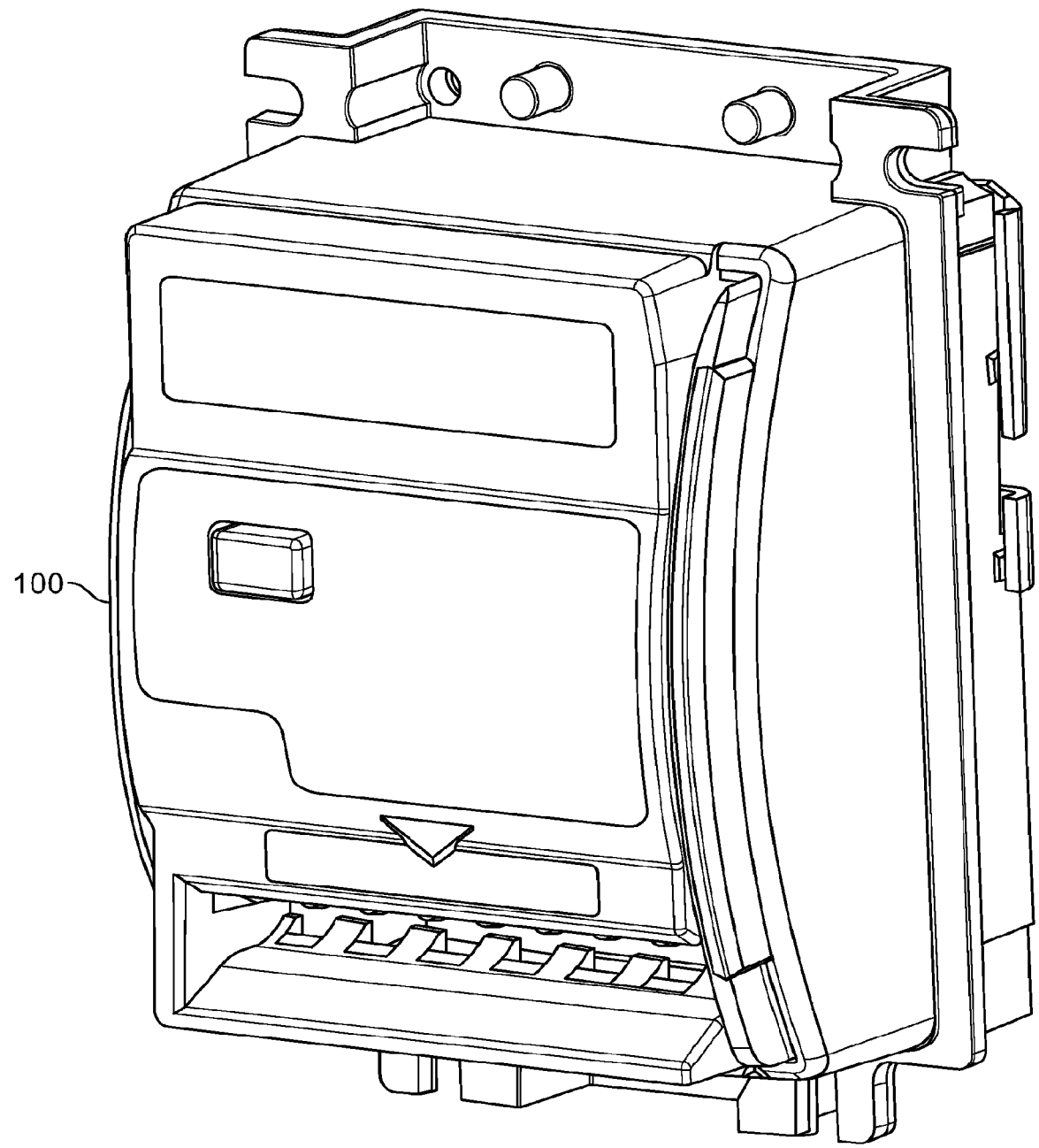
FIG. 5 illustrates the bezel assembly of FIG. 4.
Figure 6:
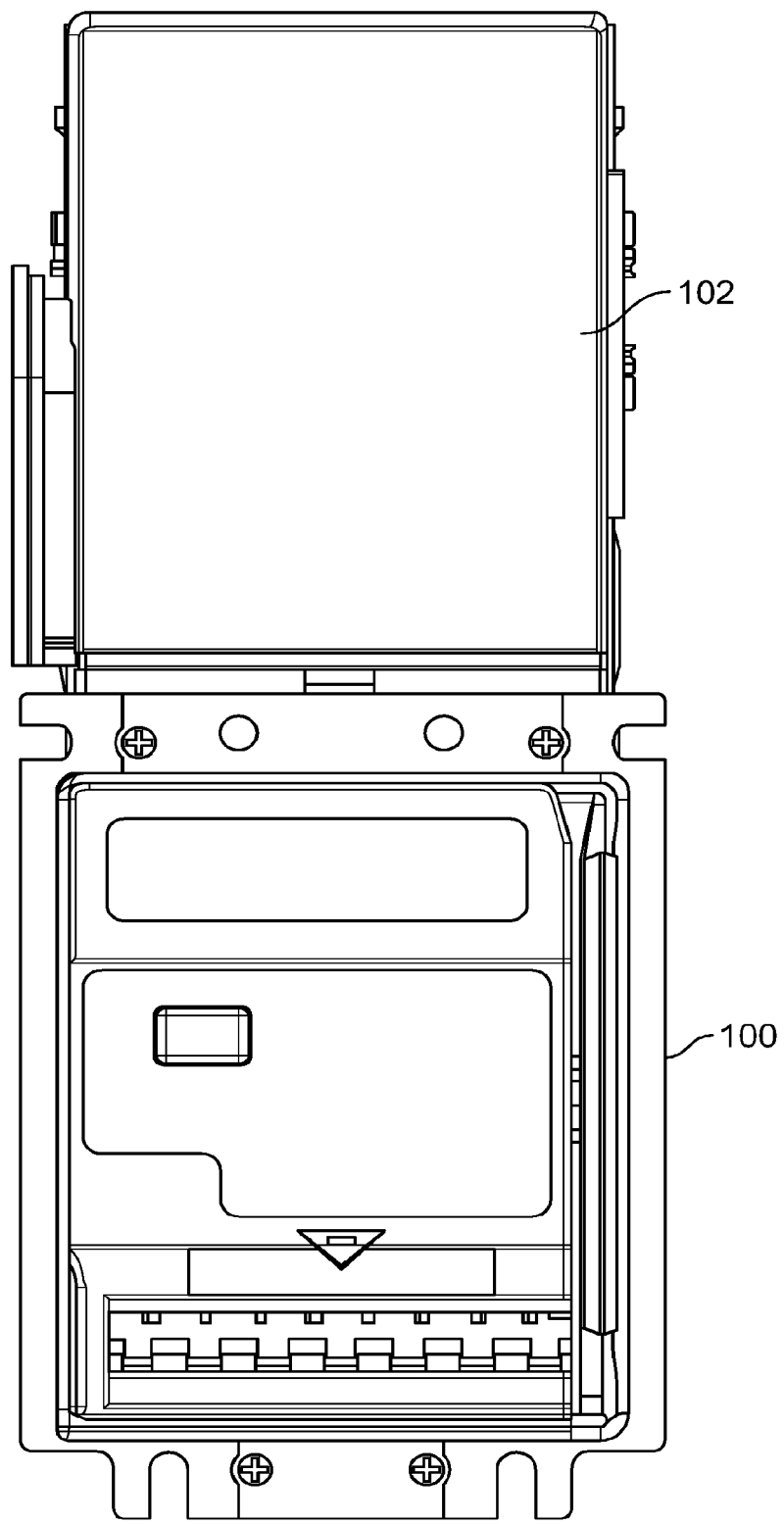
FIG. 6 illustrates a front view of the bezel assembly and bill validator of FIG.
Figure 7:
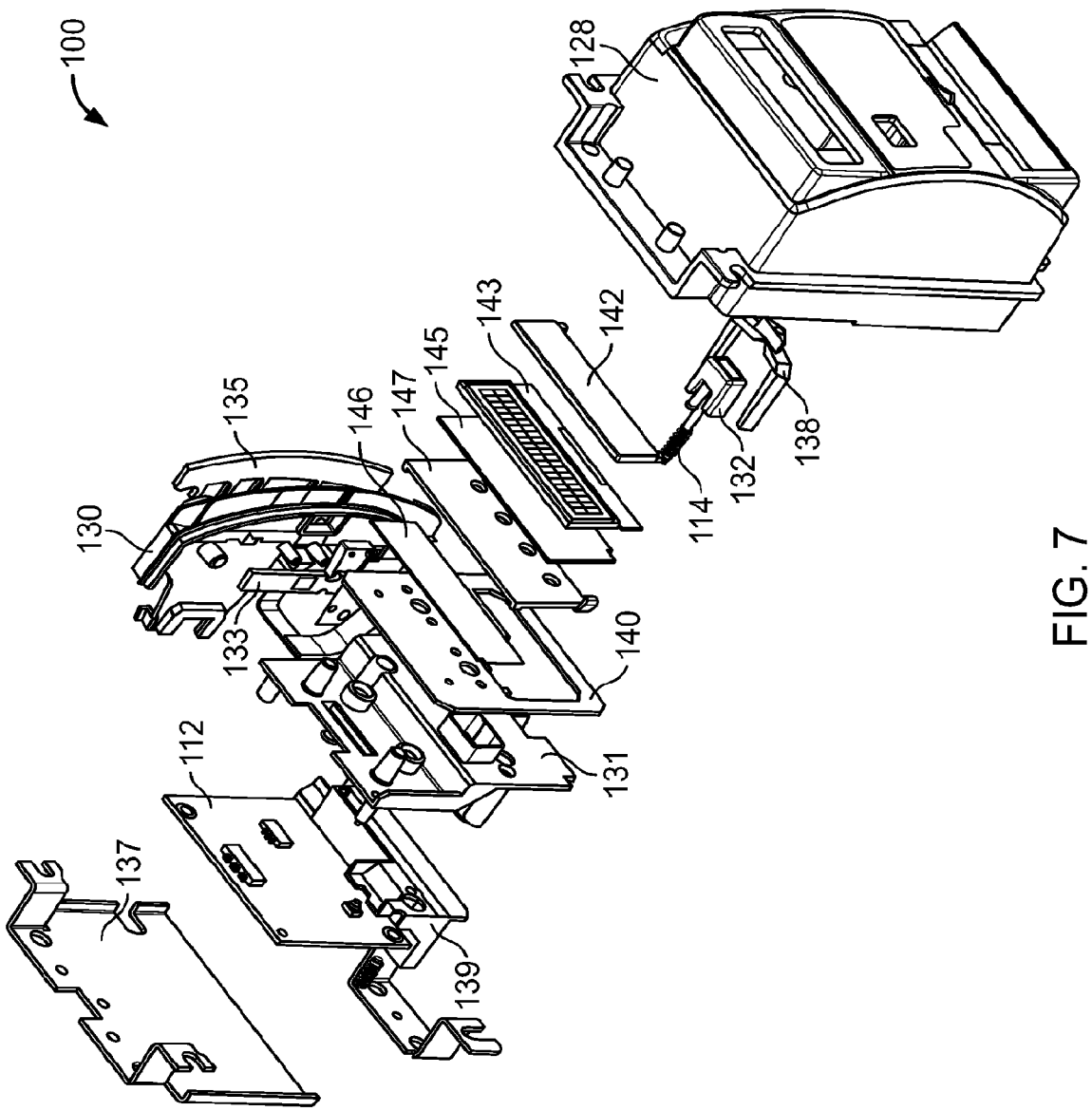
FIG. 7 is an exploded view of the bezel assembly of FIG. 4.
Figure 8:
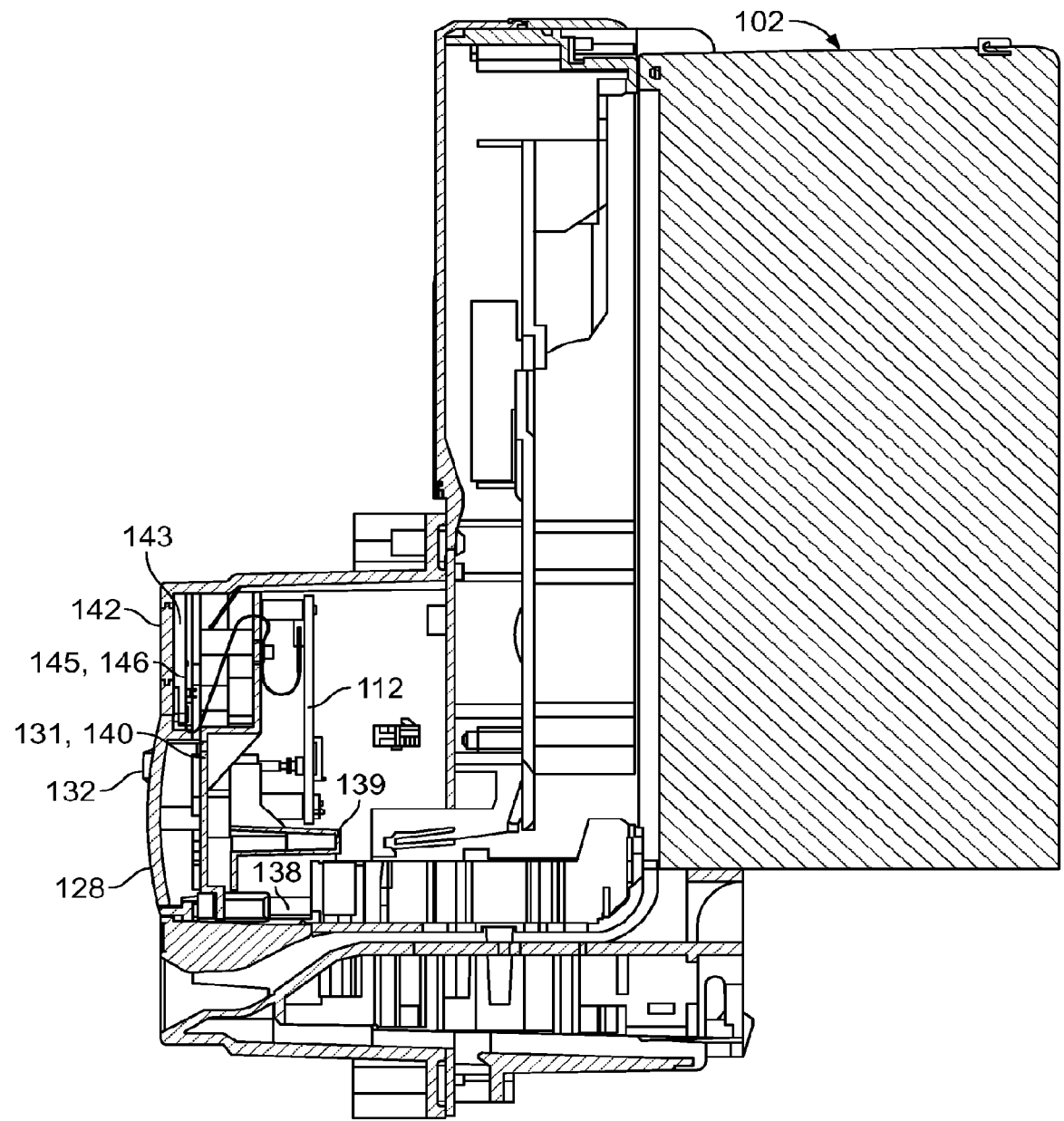
FIG. 8 is a section view of the bezel assembly of FIG. 4.

FIG. 4 illustrates a bezel assembly 100 installed on a bill validator 102. A removable cassette 104 receives, stacks and stores bills received from the validator 102. The cassette 104 is attached to the validator 102 in an "upstacker" version. FIGS. 5, 6, 7 and 8 illustrate additional views and details of the components according to the upstacker version. As shown in the example of FIGS. 7 and 8, the bezel assembly 100 includes a bezel 128, a control PCB 112 and an antenna board 140. The control PCB 112 controls the card reading devices and bezel lights.

Components for the display include a Hantronix HDG1602F-1 chip-on-glass flat display 143, a lens 142, a light bar 147 for backlighting, a transmissive right angle film ("TRAF") 145 and an enhanced specular reflector ("ESR")-PT film 146, both of which are commercially available from 3M. In addition, a prism 138 serves as a light pipe to direct light from status LEDs to the front face of the bezel 128.

Components for the credit card reader include a card swipe channel 130, a LED PCB 133 and a light bar 135.

Other features of the upstacker version include the an upper spacer plate 137, a spring 114 connected to the vend cancel button 132, and an antenna holder 131.

Figure 9:
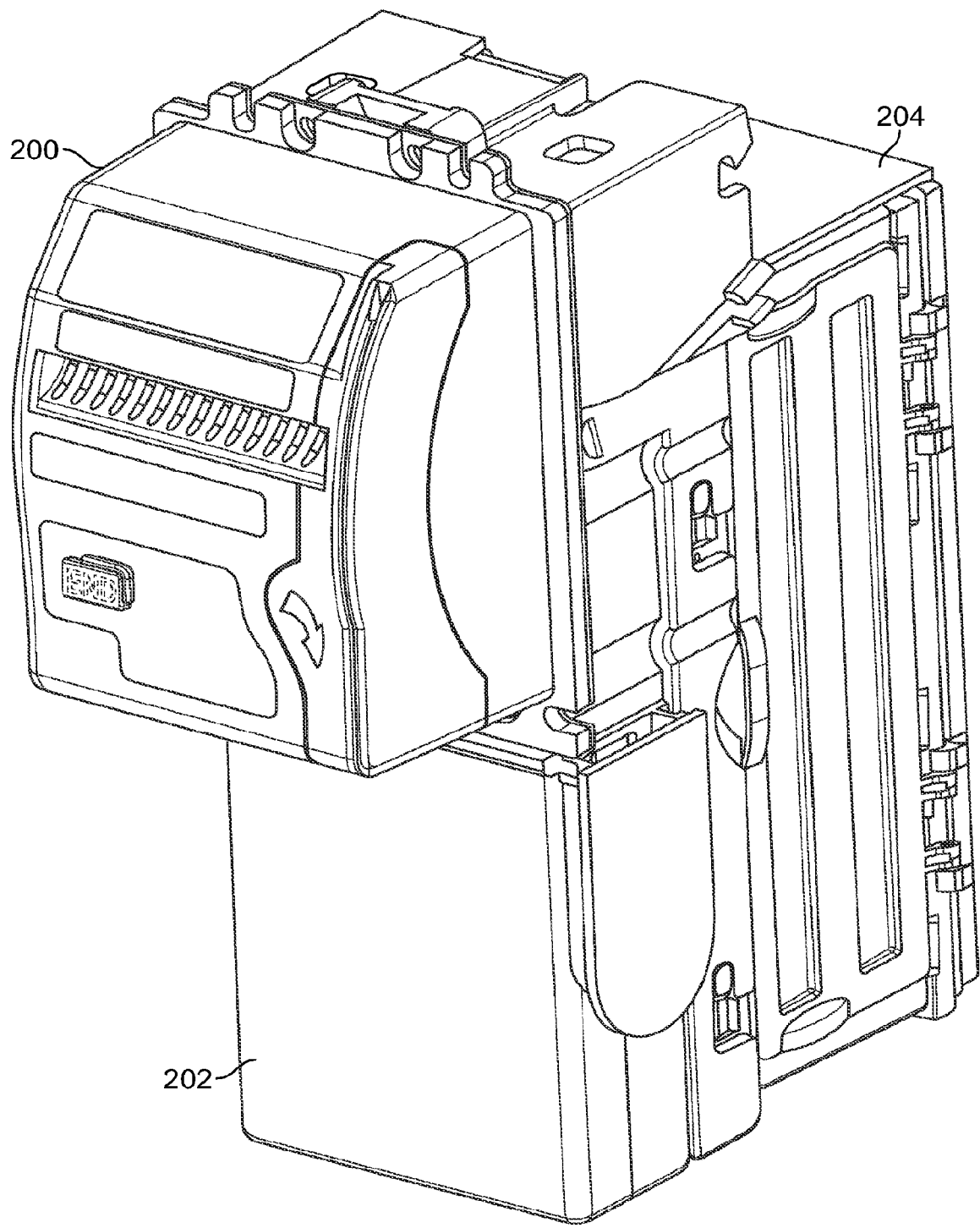
FIG. 9 is an isometric view of a bezel assembly installed on a bill validator in and ownstacker version.
Figure 10:
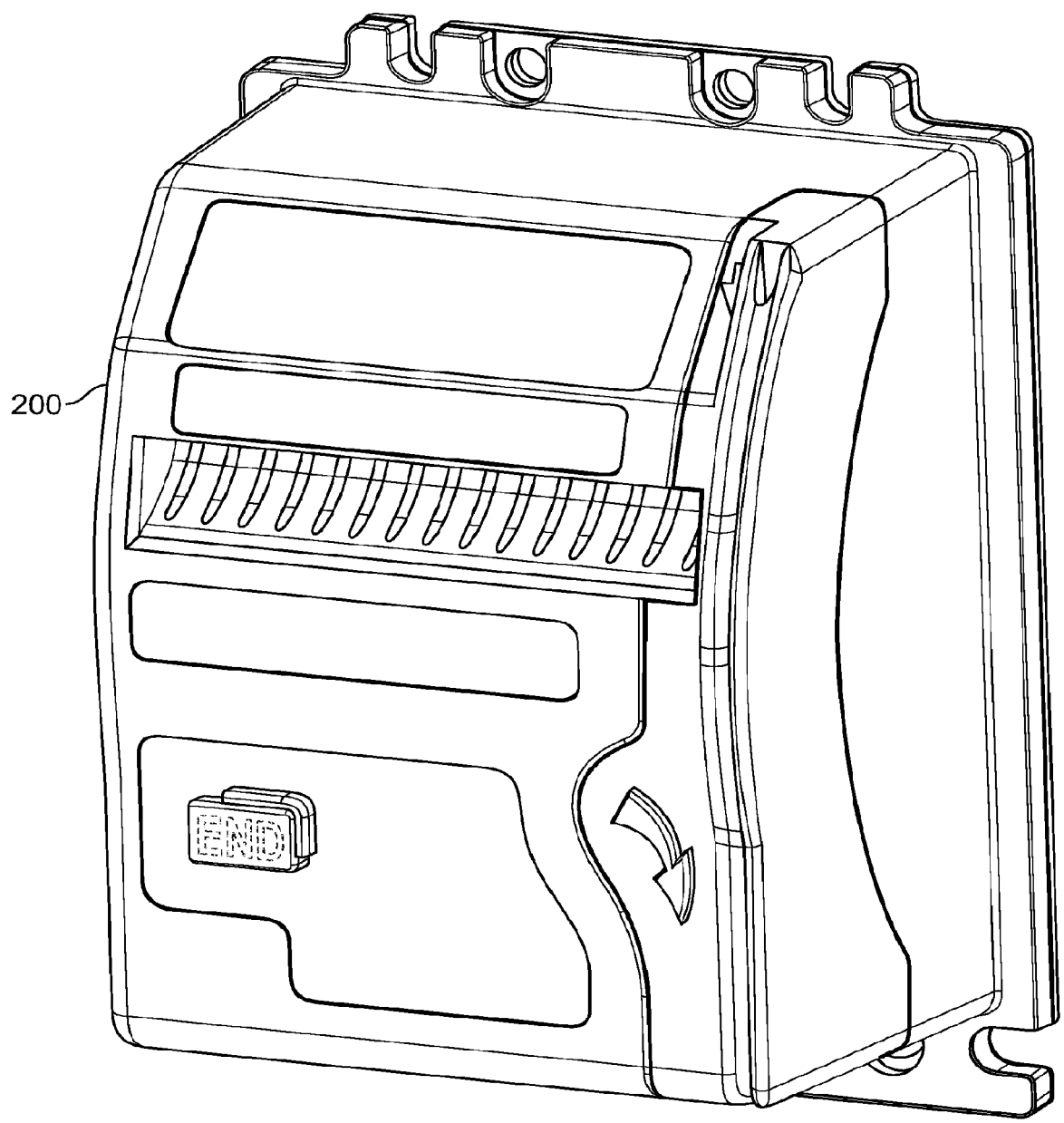
FIG. 10 illustrates the bezel assembly of FIG. 9.
Figure 11:
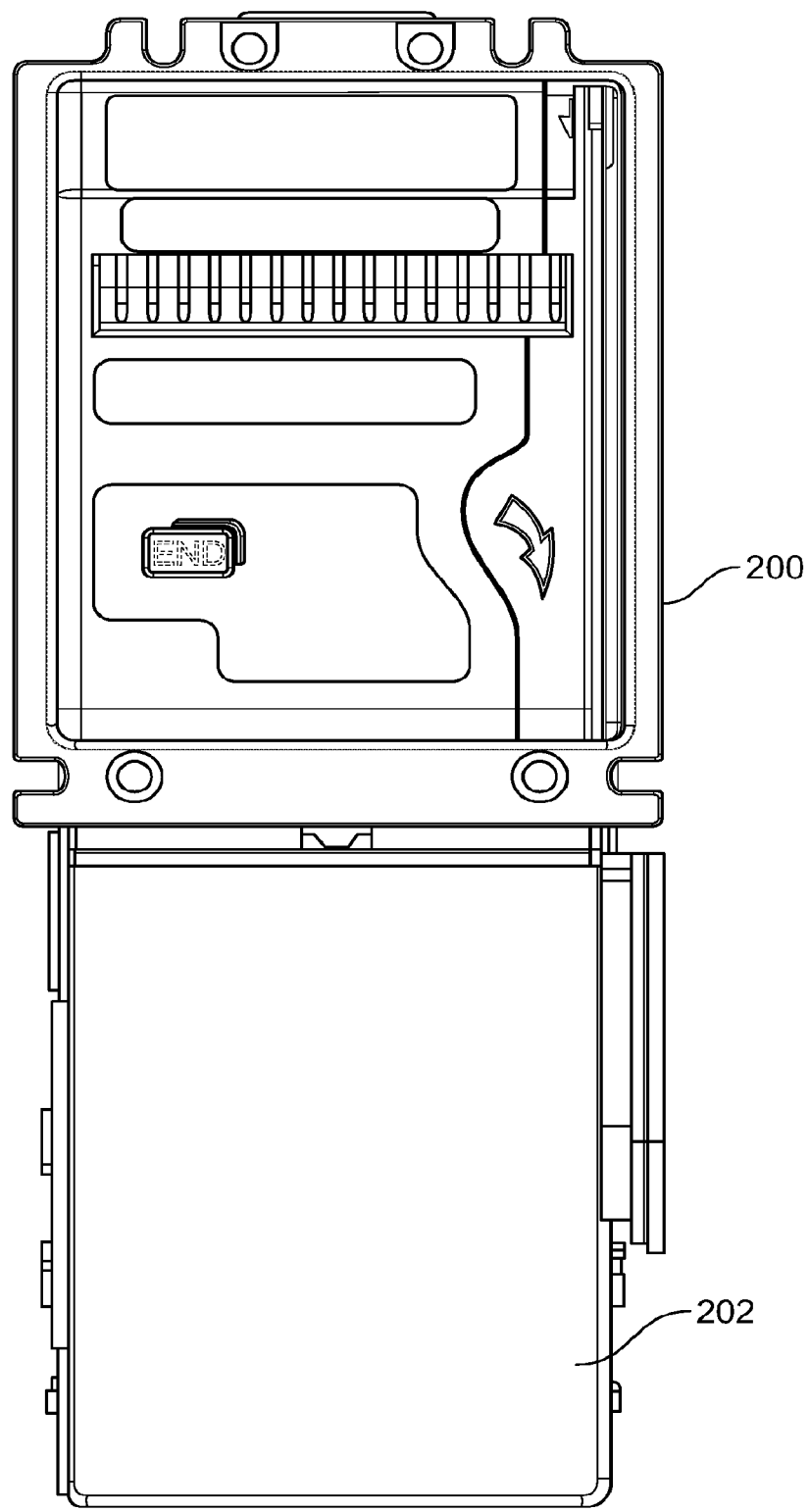
FIG. 11 illustrates a front view of the bezel assembly and bill validator of FIG. 9.
Figure 12:
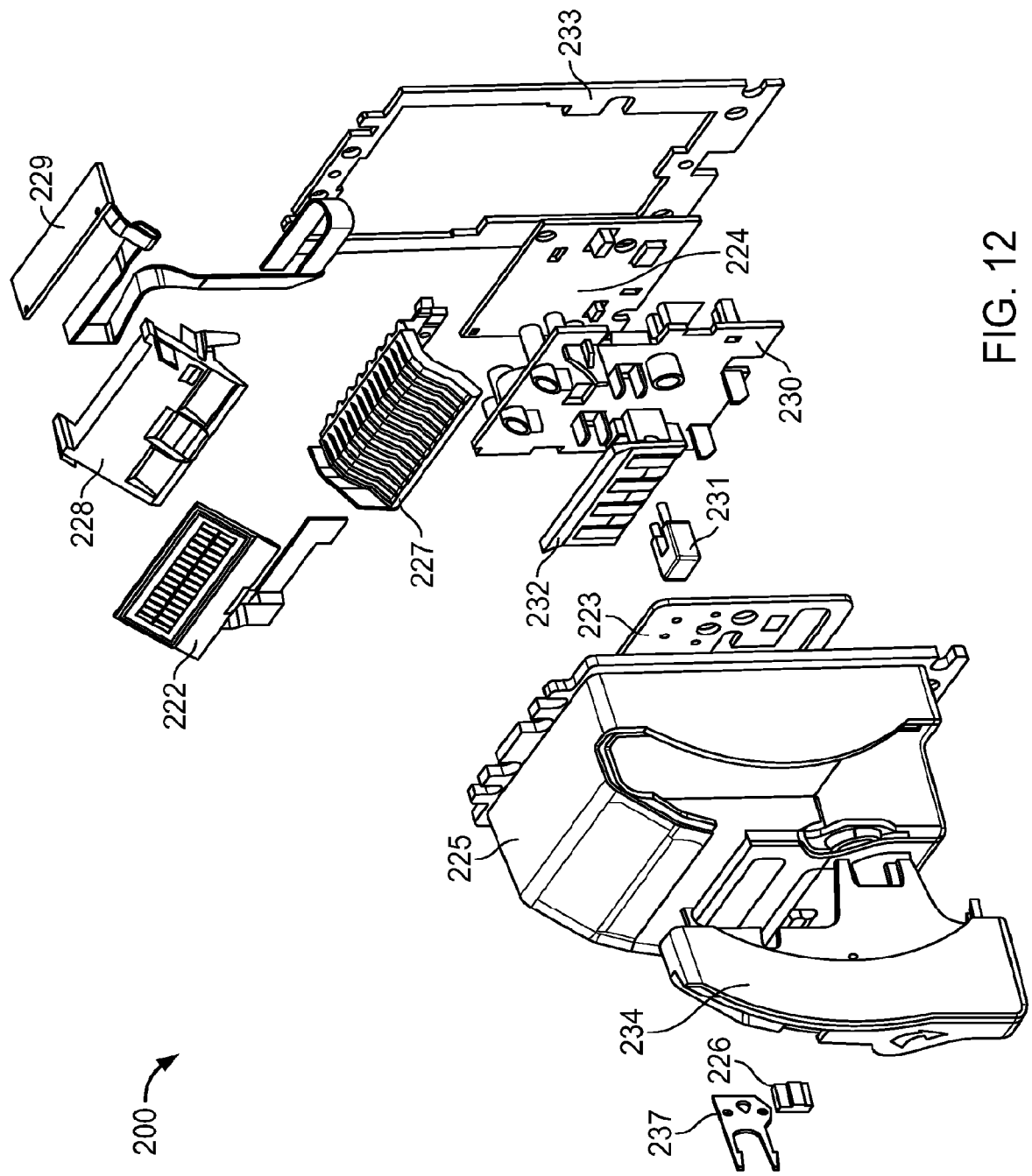
FIG. 12 is an exploded view of the bezel assembly of FIG. 9.
Figure 13:
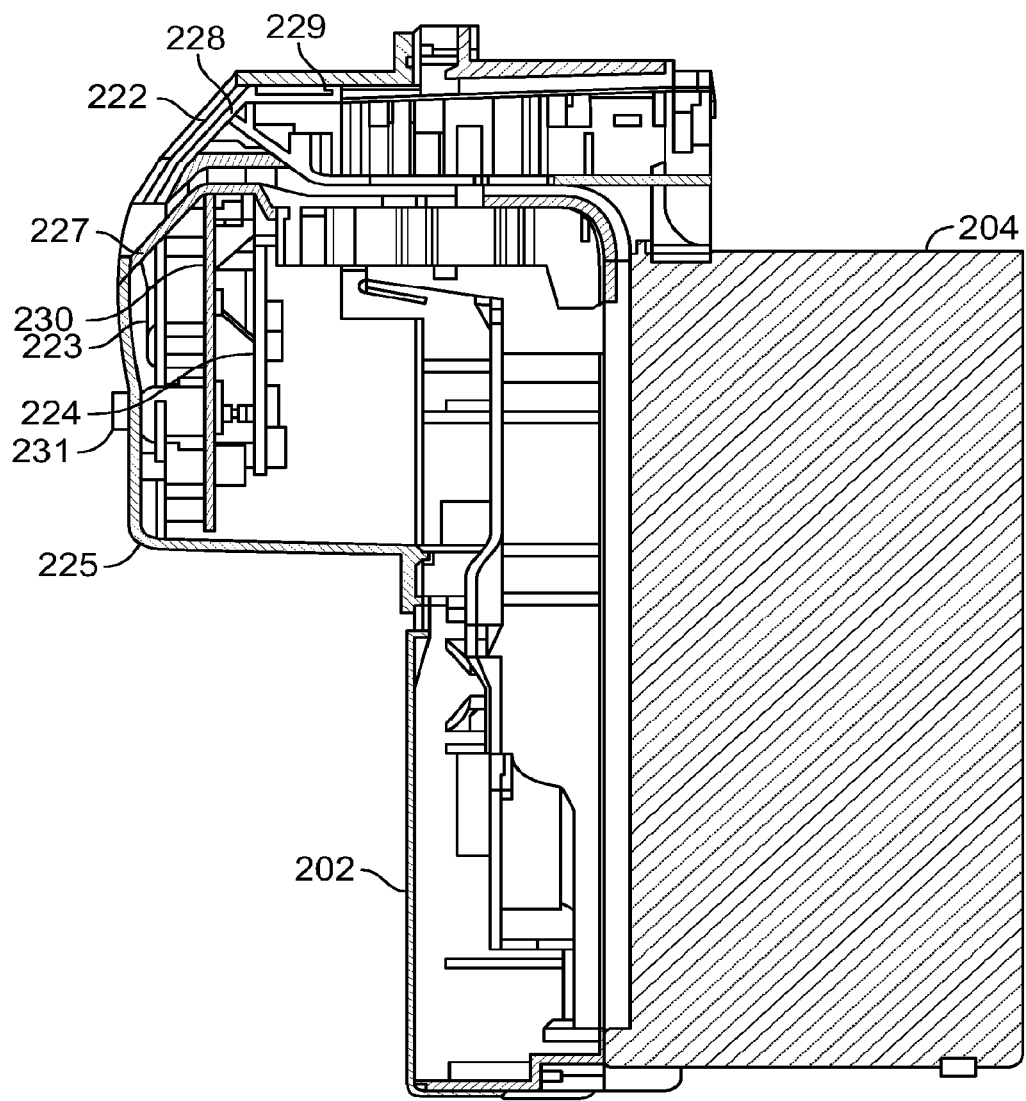
FIG. 13 is a section view of the bezel assembly of FIG. 9.

FIG. 9 illustrates a bezel assembly 200 installed on a bill validator 202. A removable cassette 104 receives, stacks and stores bills received from the validator 202. The cassette 204 is attached to the validator 202 in an "downstacker" version. FIGS. 10, 11, 12 and 13 illustrate additional views and details of the components according to the downstacker version. As shown in the example of FIGS. 12 and 13, the bezel assembly 200 includes a bezel 225, a control board 224 and an antenna assembly 223.

Components for the display include a LCD display 222, a display holder 228 and a backlight PCB 229. In the downstacker version, the display 222 is at an upward angle to facilitate viewing of displayed information by a customer. In addition, a prism 232 serves as a light pipe to direct light from status LEDs to the front face of the bezel 225.

Components for the credit card reader include a card swipe channel 234, a magnetic head 226 and a spring 237.

Other features of the downstacker version include a vend cancel button 231, a bezel insert 227, an antenna and control board holder 230 and a bezel plate 233.

Various modifications can be made to the foregoing example(s) without departing from the spirit and scope of the invention. Accordingly, other implementations are within the scope of the claims.

What is claimed is:

1. A multi media payment device comprising:
   a banknote acceptor;
   a RF card reader, the RF card reader including an antenna loop for reading information stored in a contactless smart card; and
   a display having components to illuminate the display, wherein the display overlaps at least a portion of the antenna loop, wherein the antenna loop is located behind the display relative to a front face of the device and the components to illuminate the display are located substantially inside the antenna loop area.

2. The device of claim 1 wherein the card reader unit is integrated in a bezel assembly.

3. The device of claim 1 comprising a light pipe of a material with volume diffusion properties.

4. The device of claim 3 wherein the display has a "chip-on-glass" construction.

5. The device of claim 1 having an external form factor compatible with an industry standard footprint of approximately 86 mm.times.107 mm.

6. The device of claim 1 including at least one of an alphanumeric or graphical display.

7. The device of claim 6 wherein the display is at least partially within a planar outline of the antenna of the RF card reader.

8. The device of claim 6 wherein the antenna is located on a printed circuit board on which are mounted components to illuminate the display.

9. The device of claim 1 further comprising a magnetic card reader.

10. The device of claim 9 wherein the card reader unit is integrated with a bezel assembly.

11. The device of claim 9 wherein the RF card reader includes a low profile magnetic head.

12. A multi media payment device according to claim 9 wherein the antenna loop is sized to the available area of a vending machine aperture after space has been allocated for a banknote entry slot and a magnetic stripe slot.

13. The device of claim 12 comprising indicator lights to illuminate a plurality of sections of the light pipe wherein at least some of the indicator lights are operable to flash in a strobe pattern and sequence to create an optical illusion of motion.

14. A bezel assembly for connection to a bill validator, the bezel assembly comprising:
   a reader unit including an antenna loop to read information stored on a contactless chip card; and
   a display having components to illuminate the display, wherein the display overlaps at least a portion of the antenna loop, wherein the antenna loop is located behind the display relative to a front face of the assembly and the components to illuminate the display are located substantially inside the antenna loop area.

15. The bezel assembly of claim 14 wherein the reader unit also is operable to read a magnetic swipe card.

16. The bezel assembly of claim 14 connected to a bill validator.

17. The bezel assembly of claim 14 including a first slot for insertion of a bill, a second slot for swiping a magnetic swipe card, and the antenna loop to read the contactless chip card placed in proximity to the bezel assembly.

18. The bezel assembly of claim 14 including a light pipe and indicator lights to illuminate sections of the light pipe, wherein the indicator lights are operable to flash in a strobe pattern and sequence.

19. The bezel assembly of claim 14 having an external form factor compatible with a footprint of approximately 84 mm.times.107 mm.

20. A method of upgrading a vending machine with capability of reading contactless chip cards and magnetic swipe cards, the method comprising:
   installing a bezel assembly comprising hardware to read the contactless chip cards and magnetic swipe cards; and
   connecting the bezel assembly to an input port of a data collecting module;
   wherein the hardware comprises an antenna loop to read information stored on the contactless chip card, wherein at least a portion of the antenna loop is configured to overlap behind a display relative to a front face of the assembly, and the display having components to illuminate the display that are located substantially inside the antenna loop area.

21. The method of claim 20, wherein the bezel assembly further includes a slot for insertion of a bill, the method including connecting the bezel assembly to a bill validator, wherein the bill validator is arranged to receive a bill inserted into the slot.

* * * * *